(12) United States Patent
Chung

(10) Patent No.: US 9,383,044 B2
(45) Date of Patent: Jul. 5, 2016

(54) LOW COST UMBILICUS WITHOUT OVERMOLDING

(71) Applicant: Fenwal, Inc., Lake Zurich, IL (US)

(72) Inventor: Terry Chung, Kildeer, IL (US)

(73) Assignee: Fenwal, Inc., Lake Zurich, IL (US)

( * ) Notice: Subject to any disclaimer, the term of this patent is extended or adjusted under 35 U.S.C. 154(b) by 509 days.

(21) Appl. No.: 13/768,455

(22) Filed: Feb. 15, 2013

(65) Prior Publication Data

US 2014/0230944 A1    Aug. 21, 2014

(51) Int. Cl.
*B04B 5/04* (2006.01)
*F16L 9/00* (2006.01)
*B29D 22/00* (2006.01)

(52) U.S. Cl.
CPC .............. *F16L 9/00* (2013.01); *B04B 5/0442* (2013.01); *B29D 22/00* (2013.01); *B04B 2005/0492* (2013.01); *Y10T 156/1002* (2015.01)

(58) Field of Classification Search
CPC .............. B04B 2005/045; B04B 2005/0464; B04B 2005/0492; B04B 5/0042; F16C 1/08; F16L 39/00; F16L 39/02
See application file for complete search history.

(56) References Cited

U.S. PATENT DOCUMENTS

| | | | |
|---|---|---|---|
| 2,832,374 A | 4/1958 | November |
| 2,936,791 A | 5/1960 | Farrar |
| 2,983,639 A | 5/1961 | Jageman |
| 3,678,964 A | 7/1972 | Andrews |
| 3,747,632 A | 7/1973 | Kok et al. |
| 3,861,972 A | 1/1975 | Glover et al. |
| 3,885,735 A | 5/1975 | Westbert |
| 4,018,304 A | 4/1977 | Lolachi et al. |
| 4,056,224 A | 11/1977 | Lolachi |
| 4,108,353 A | 8/1978 | Brown |
| 4,109,852 A | 8/1978 | Brown et al. |
| 4,109,854 A | 8/1978 | Brown |
| 4,109,855 A | 8/1978 | Brown et al. |
| 4,113,173 A | 9/1978 | Lolachi |
| 4,114,802 A | 9/1978 | Brown |

(Continued)

FOREIGN PATENT DOCUMENTS

EP    2 397 229 A2    12/2011
JP      01164888 A     6/1989

(Continued)

OTHER PUBLICATIONS

Extended European Search Report for European patent appl'n. No. 13187606.2, dated May 22, 2014.

(Continued)

*Primary Examiner* — Timothy Cleveland
(74) *Attorney, Agent, or Firm* — Cook Alex Ltd.

(57) ABSTRACT

An umbilicus is provided for use in an umbilicus-driven fluid processing system. The umbilicus is free of a drive shaft and includes an umbilicus body having enlarged first and second ends, with an intermediate section located therebetween. At least one fluid-transmitting lumen extends between the first and second ends. The umbilicus further includes first and second end fittings, each associated with one of the ends of the umbilicus body. Each end fitting defines an interior cavity having a flared portion, with at least a portion of one of the enlarged ends of the umbilicus body being seated within the flared portion. The enlarged ends of the umbilicus body may be formed using a heated die at least partially inserted into the fluid-transmitting lumen.

21 Claims, 7 Drawing Sheets

(56) References Cited

U.S. PATENT DOCUMENTS

| | | | |
|---|---|---|---|
| 4,120,449 A | 10/1978 | Brown et al. |
| 4,163,519 A | 8/1979 | Stabile |
| 4,164,318 A | 8/1979 | Boggs |
| 4,194,684 A | 3/1980 | Boggs |
| 4,221,322 A | 9/1980 | Drago et al. |
| 4,230,263 A | 10/1980 | Westberg |
| 4,245,383 A | 1/1981 | Boggs |
| 4,261,507 A | 4/1981 | Baumler |
| 4,372,484 A | 2/1983 | Larsson et al. |
| 4,385,021 A | 5/1983 | Neeley |
| 4,389,206 A | 6/1983 | Bacehowski et al. |
| 4,389,207 A | 6/1983 | Bacehowski et al. |
| 4,425,112 A | 1/1984 | Ito |
| 4,439,178 A | 3/1984 | Mulzet |
| 4,440,195 A | 4/1984 | van Dongeren |
| 4,459,169 A | 7/1984 | Bacehowski et al. |
| 4,517,404 A | 5/1985 | Hughes et al. |
| 4,540,397 A | 9/1985 | Lolachi et al. |
| 4,636,193 A | 1/1987 | Cullis |
| 4,636,346 A | 1/1987 | Gold et al. |
| 4,710,161 A | 12/1987 | Takabayashi et al. |
| 4,778,444 A | 10/1988 | Westberg et al. |
| 4,865,081 A | 9/1989 | Neumann et al. |
| 4,950,401 A | 8/1990 | Unger et al. |
| 4,986,442 A | 1/1991 | Hinterreiter |
| 5,097,870 A | 3/1992 | Williams |
| 5,160,310 A | 11/1992 | Yhland |
| 5,305,799 A | 4/1994 | Dal Palu |
| 5,360,542 A | 11/1994 | Williamson et al. |
| 5,362,291 A | 11/1994 | Williamson, IV |
| 5,449,022 A | 9/1995 | Witthaus et al. |
| 5,501,840 A | 3/1996 | Mantovani et al. |
| 5,514,069 A | 5/1996 | Brown et al. |
| 5,551,942 A | 9/1996 | Brown et al. |
| 5,704,887 A | 1/1998 | Slowik et al. |
| 5,772,159 A | 6/1998 | Wendt |
| 5,989,177 A | 11/1999 | West et al. |
| 5,996,634 A | 12/1999 | Dennehey et al. |
| 6,267,537 B1 | 7/2001 | Breivik et al. |
| 6,344,020 B1 | 2/2002 | Reitz et al. |
| 6,419,073 B1 | 7/2002 | Piron |
| 6,800,054 B2 | 10/2004 | Westberg et al. |
| 6,832,981 B2 | 12/2004 | Witthaus et al. |
| 6,979,776 B1 | 12/2005 | Zimmermann |
| 7,001,321 B1 | 2/2006 | Brown et al. |
| 7,008,366 B1 | 3/2006 | Aitkenhead et al. |
| 7,452,323 B2 | 11/2008 | Aitkenhead et al. |
| 7,849,885 B2 | 12/2010 | Olsen et al. |
| 8,216,120 B2 | 7/2012 | Aitkenhead et al. |
| 8,257,239 B2 | 9/2012 | Manzella, Jr. et al. |
| 8,277,369 B2 | 10/2012 | West |
| 8,460,165 B2 | 6/2013 | Manzella, Jr. et al. |
| 2002/0195154 A1 | 12/2002 | Witthaus et al. |
| 2006/0111229 A1 | 5/2006 | Aitkenhead et al. |
| 2009/0239730 A1 | 9/2009 | Aitkenhead et al. |
| 2010/0261596 A1 | 10/2010 | Schimmelpfennig et al. |
| 2011/0303316 A1 | 12/2011 | Manzella |
| 2011/0306913 A1 | 12/2011 | West |

FOREIGN PATENT DOCUMENTS

| | | |
|---|---|---|
| WO | WO2004046601 A1 | 6/2004 |
| WO | WO2009/062714 A1 | 5/2009 |
| WO | WO2011/044237 A1 | 4/2011 |

OTHER PUBLICATIONS

U.S. Appl. No. 13/835,255 (pending) to Pieper filed on Mar. 15, 2013, entitled "Multilumen Connector to Multiple Individual Tubing".

LOW COST UMBILICUS WITHOUT OVERMOLDING

FIELD OF THE DISCLOSURE

The present subject matter relates to an umbilicus for use in a fluid processing system.

DESCRIPTION OF RELATED ART

Whole blood is routinely separated into its various components, such as red blood cells, platelets, and plasma. In continuous blood processing systems, whole blood is drawn from a donor, the particular blood component or constituent is removed and collected, and the remaining blood constituents are returned to the donor. By thus removing only particular constituents, less time is needed for the donor's body to return to normal, and donations can be made at more frequent intervals than when whole blood is collected. This increases the overall supply of blood constituents, such as plasma and platelets, made available for health care.

Whole blood is typically separated into its constituents through centrifugation. This requires that the whole blood be passed through a centrifuge after it is withdrawn from, and before it is returned to, the donor. To avoid contamination, the blood is usually contained within a sealed, sterile fluid flow system during the entire centrifugation process. Typical blood processing systems thus include a permanent, reusable centrifuge assembly or "hardware" that spins and pumps the blood, and a disposable, sealed and sterile fluid processing or fluid circuit assembly that actually makes contact with the donor's blood. The centrifuge assembly engages and spins a portion of the fluid processing assembly (often called the centrifuge or separation chamber) during a collection procedure. The blood, however, makes actual contact only with the disposable fluid processing assembly, which is used only once and then discarded.

To avoid the need for rotating seals, and to preserve the sterile and sealed integrity of the fluid processing assembly, continuous blood processing systems often utilize centrifuges that operate on the "one-omega, two-omega" operating principle. This principle is disclosed in detail in U.S. Pat. No. 4,120,449 to Brown et al., which is hereby incorporated by reference, and enables centrifuges to spin a sealed, closed system without the need for rotating seals. Blood processing systems that make use of the principle typically include a fluid processing assembly that includes a plastic bag or molded chamber that is spun in the centrifuge and that is connected to the blood donor and to a stationary portion of the centrifuge assembly through an elongated member that may be made up of one or more plastic tubes. The elongated member is commonly referred to as an "umbilicus" and is typically arranged in a question mark (or upside-down question mark) configuration with both of its end portions coaxially aligned with the axis of rotation of the centrifuge. The centrifuge chamber is rotated at "two-omega" RPM and the umbilicus is orbited around the centrifuge chamber at "one-omega" RPM. In other words, one end of the umbilicus is stationary, the other end rotates at a two-omega speed with the centrifuge chamber to which it is attached, and the intermediate portion or midsection of the umbilicus orbits about the chamber at a one-omega speed. The effect is that the end of the umbilicus, which is opposite the bag or chamber and is connected to the donor via plastic tubing, does not twist up as the bag is spun. The sealed, sterile integrity of the fluid processing assembly is thus maintained without the need for rotating seals.

U.S. Pat. No. 5,996,634 to Dennehey et al., which is hereby incorporated herein by reference, discloses one such blood processing apparatus based on the "one-omega, two-omega" operating principle. In this apparatus, a disposable fluid processing assembly having an umbilicus and a processing chamber is mountable within a centrifuge assembly. One "fixed" end of the umbilicus is held rotationally stationary substantially over the axis of centrifugation. The other "free" end of the umbilicus joins the processing chamber and is free to rotate with the processing chamber around the axis of centrifugation. The mid-portion of the umbilicus is supported by a wing plate that orbits the mid-portion of the umbilicus around the axis of centrifugation at the one-omega speed. On account of having one "fixed" end and one "free" end, the umbilicus will "twist" about its own central axis as its mid-portion orbits around the processing chamber. The action of the umbilicus naturally "untwisting" itself will cause its "free" end (and, hence, the associated processing chamber) to spin at the average prescribed two-omega speed. This arrangement eliminates the need for complex gearing or belting arrangements to create a one-omega, two-omega drive relationship that was common in prior art devices. The umbilicus itself drives the processing chamber at a two-omega speed.

A typical umbilicus comprises a unitarily formed (generally by an extrusion process) main body defining a plurality of fluid-transmitting lumen. The body is formed of a material specially selected to perform the several required functions of the umbilicus, including being flexible enough to assume the proper orientation with regard to the centrifuge assembly, rigid enough to serve as a drive mechanism for rotating the processing chamber, and having a torsional stiffness leading to the aforementioned "untwisting" at the proper two-omega speed during fluid processing. A known material used in forming the umbilicus is the thermoplastic polyester elastomeric material sold by E.I. DuPont de Nemours & Company under the trademark Hytrel®. The Hytrel® material may also be used to form enlarged end blocks that are over-molded onto the ends of the umbilicus for being clamped into different portions of the centrifuge assembly, with one (the "zero omega end block") being held in place with respect to the centrifuge assembly and the other (the "two omega end block") allowed to rotate freely, as described above. Polyvinyl chloride ("PVC") tubing connecting the umbilicus to the remainder of fluid circuit assembly is bonded to the end blocks.

While such a known umbilicus has proven suitable, it can be relatively expensive to manufacture, and the need remains for a relatively low-cost improved umbilicus.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an umbilicus is provided for use in an umbilicus-driven fluid processing system. The umbilicus is free of a drive shaft and includes an elongated umbilicus body having first and second ends, with an intermediate section located therebetween. The umbilicus body defines at least one fluid-transmitting lumen extending between the first and second ends. The first end is enlarged compared to the intermediate section. The umbilicus further includes a first end fitting defining an interior cavity. The interior cavity of the first end fitting includes a flared portion, with at least a portion of the enlarged first end of the umbilicus body being seated within the flared portion of the interior cavity of the first end fitting.

In another aspect, an umbilicus is provided for use in an umbilicus-driven fluid processing system. The umbilicus is free of a drive shaft and includes an elongated umbilicus body having first and second ends, with an intermediate section located therebetween. The first and second ends of the umbilicus body are enlarged compared to the intermediate section, with at least one fluid-transmitting lumen extending therebetween. Also provided are first and second end fittings each defining an interior cavity having a flared portion. At least a portion of the enlarged first end of the umbilicus body is seated within the flared portion of the interior cavity of the first end fitting, while at least a portion of the enlarged second end of the umbilicus body is seated within the flared portion of the interior cavity of the second end fitting, with the first and second end fittings being trapped between the enlarged first and second ends of the umbilicus body.

DESCRIPTION OF THE ILLUSTRATED EMBODIMENTS

The embodiments disclosed herein are for the purpose of providing the required description of the present subject matter. They are only exemplary, and may be embodied in various forms and in various combinations. Therefore, specific details disclosed herein are not to be interpreted as limiting the subject matter as defined in the accompanying claims.

Figure 1:
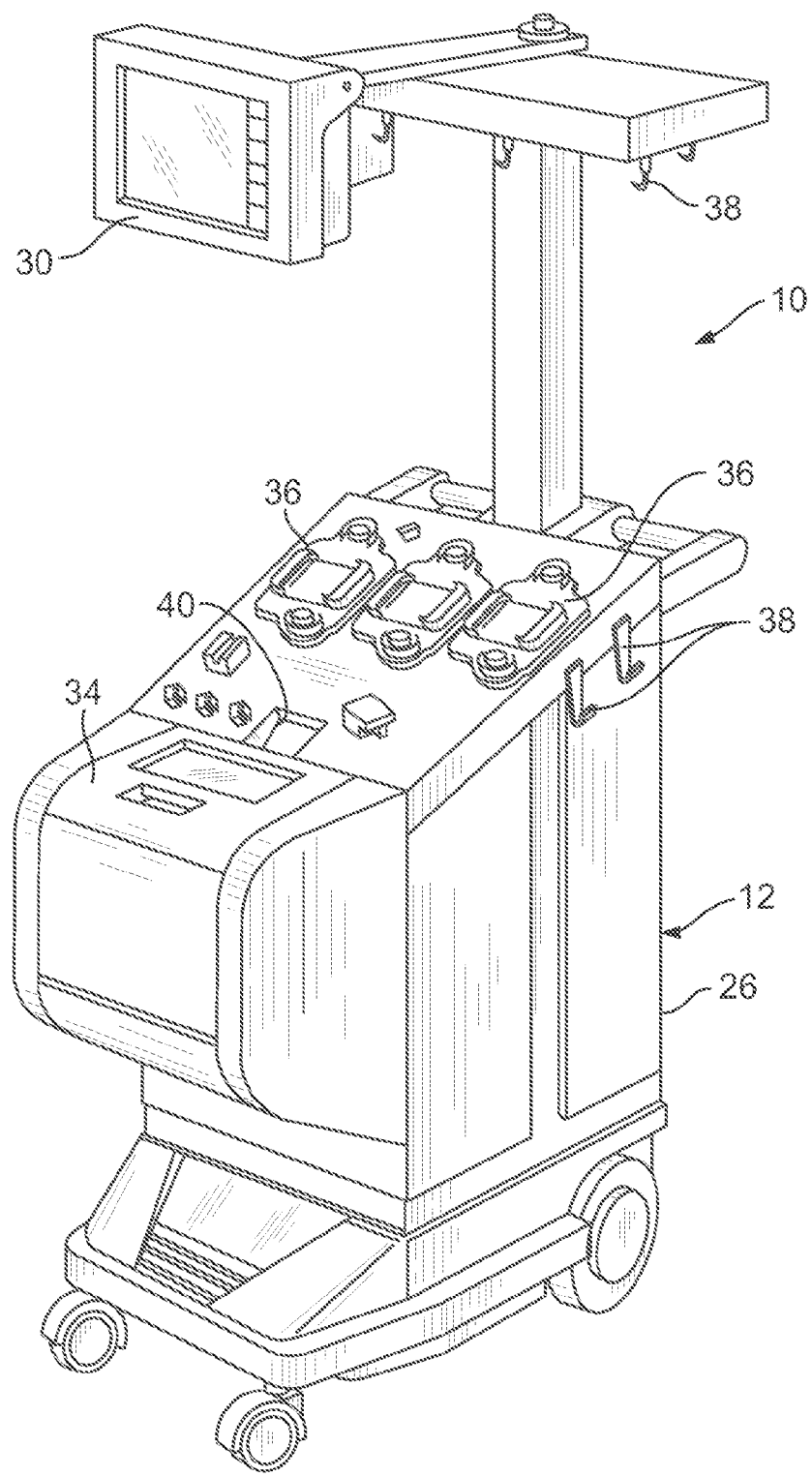
FIG. 1 is a perspective view of an exemplary durable fluid processing system that may be used in combination with umbilici according to the present disclosure.

FIG. 1 shows an exemplary durable centrifugal fluid processing device or system 10 that may be used in combination with a fluid processing circuit having an umbilicus according to the present disclosure, although it should be understood that other centrifugal fluid processing systems may be employed without departing from the scope of the present disclosure. The system 10 represented in FIG. 1 is currently marketed as the AMICUS® separator by Fenwal, Inc. of Lake Zurich, Ill. The system 10 can be used for processing various fluids, but is particularly well suited for processing whole blood, blood components, or other suspensions of biological cellular materials. The system 10 includes a centrifuge assembly 12 for separating a fluid into its constituent parts. A more detailed description of the centrifuge assembly 12 and the other elements of the system 10 can be found in U.S. Pat. No. 5,996,634, which is incorporated by reference herein.

Figure 2:
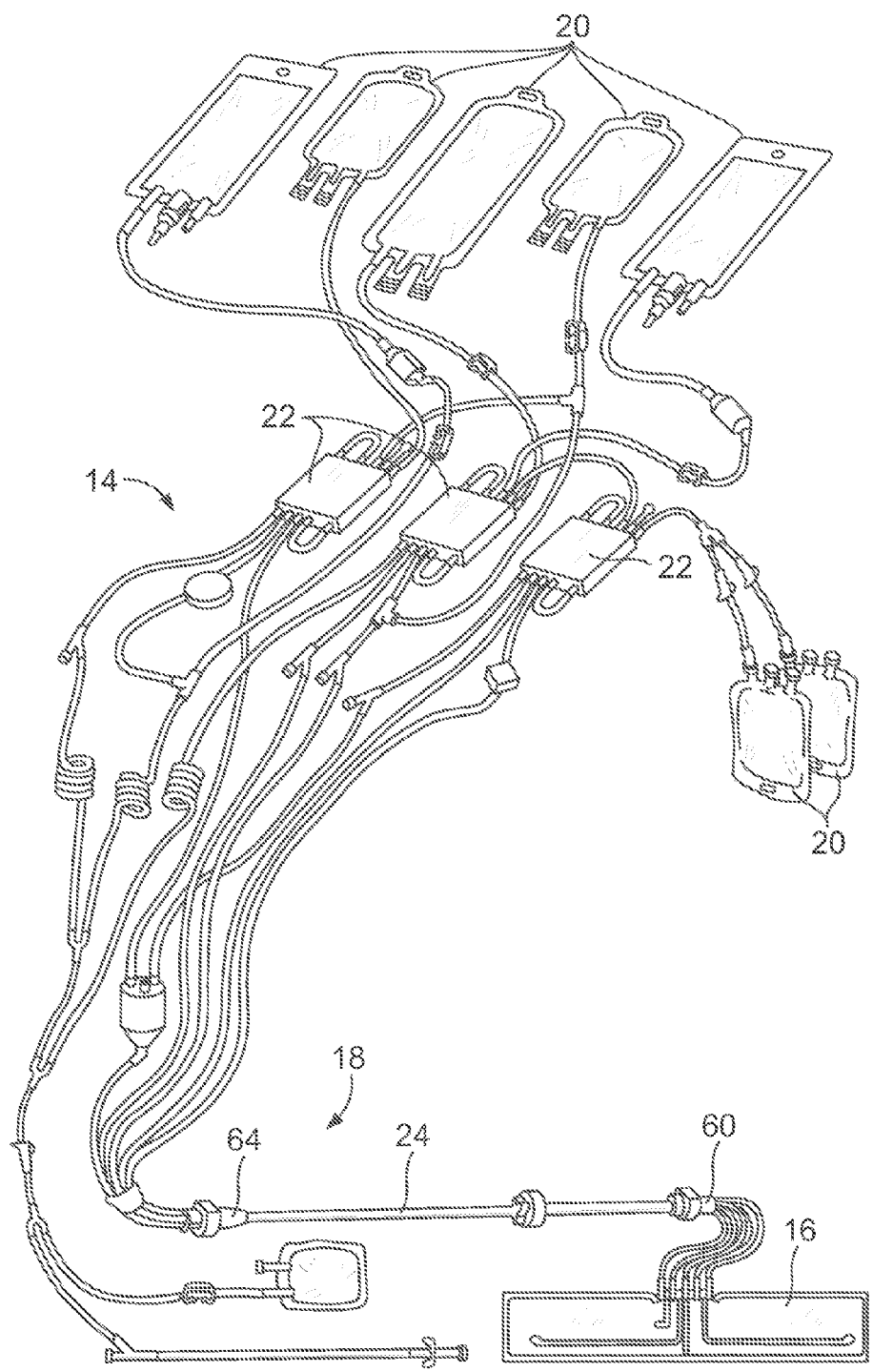
FIG. 2 is a perspective view of a disposable fluid processing assembly usable in association with the durable fluid processing system of FIG. 1.
Figure 3:
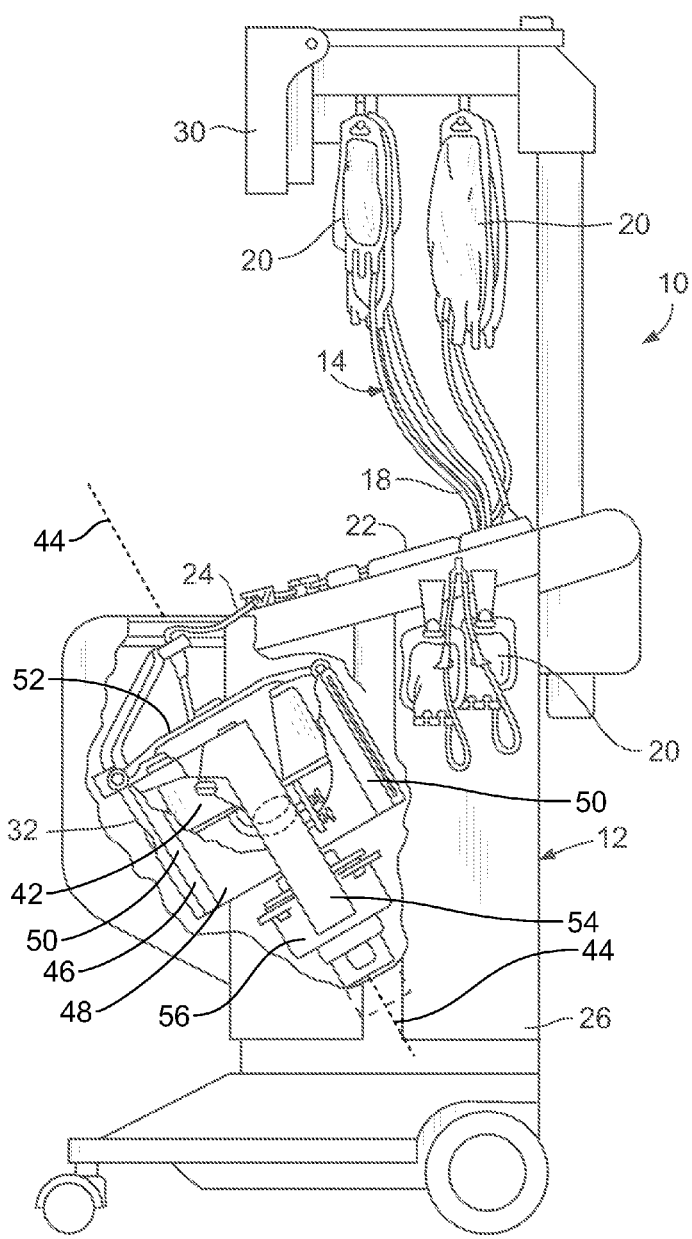
FIG. 3 is a side elevational view of the disposable fluid processing assembly of FIG. 2 mounted on the durable fluid processing system of FIG. 1, which is partially broken away.

The durable fluid processing system 10 is used in combination with a disposable processing set or fluid circuit 14, an example of which is shown in FIG. 2. FIG. 3 shows the disposable set 14 mounted on the durable system 10. The disposable set 14 is a preferably single use, disposable item loaded on the system 10 at the time of use. After a fluid processing procedure has been completed, the operator preferably removes the disposable set 14 from the system 10 and discards it.

The disposable set 14 includes a processing chamber 16 (FIG. 2) and associated fluid flow tubing, containers, and other components. In use, the centrifuge assembly 12 rotates the processing chamber 16 to centrifugally separate blood components. Whole blood is conveyed to the processing chamber 16 from a donor or from another source of blood (such as a bag of collected blood), and separated blood components are conveyed from the processing chamber 16, through a plurality of flexible tubes that form part of a fluid circuit 18. The fluid circuit 18 further includes a plurality of containers 20 that may be supported by elevated hangers located over the centrifuge assembly 12 (see FIG. 3) and that dispense and receive liquids during processing. Fluid flow through the fluid circuit 14 may be controlled in a variety of ways. In the illustrated embodiment, fluid flow is controlled via cassettes 22 with pre-formed fluid passageways, which may be selectively opened and closed pneumatically, hydraulically, or by movable actuators. The number of cassettes may vary, but in the illustrated embodiment, there are three cassettes 22, which operate in association with valve and pump stations on the centrifuge assembly 12 to direct liquid flow among multiple liquid sources and destinations during a blood processing procedure. Tubes connected to the processing chamber 16 lead to a flexible umbilicus 24, with additional tubes at the other end of the umbilicus 24 fluidly connecting the processing chamber 16 (via the umbilicus 24) to the remainder of the disposable set 14, including the containers 20 and the cassettes 22. The umbilicus 24 is shown separately from the disposable set in FIG. 5, while various components and portions thereof are shown in greater detail in FIGS. 6-8 and 10-17 and will be described in greater detail herein. Advantageously, the disposable set 14 is a pre-assembled, pre-sterilized closed system, assuring an operator that it is a sterile unit.

As illustrated, the centrifuge assembly 12 includes a wheeled cabinet 26 that can be easily rolled from place to place. A user-actuable processing controller 30 is provided which enables the operator to control various aspects of the blood processing procedure. A centrifuge rotor assembly 32 is provided behind a fold open door 34 that can be pulled open at the front of the cabinet 26 (FIG. 3). A plurality of valve and pump stations 36 (FIG. 1) are provided on the top face of the cabinet for receiving and controlling the various cassettes 22. A plurality of hooks or hangers 38 are provided on the cabinet 26 for suspending the various containers 20.

Figure 4:
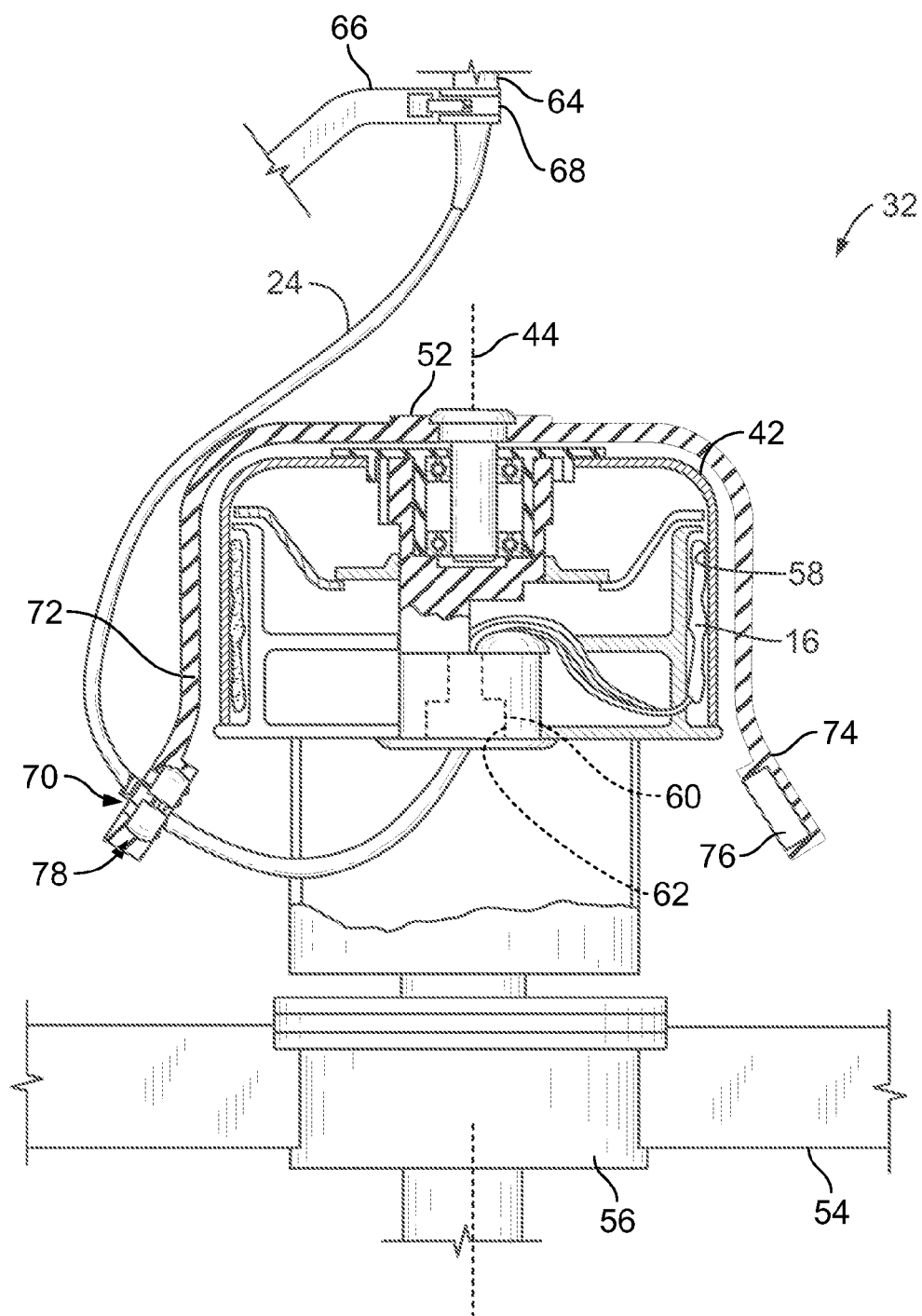
FIG. 4 is a side detail view of a centrifuge included in the durable fluid processing system of FIG. 1, showing the centrifuge in combination with an umbilicus of the disposable fluid processing assembly.

In use, the fold open door 34 is opened and the processing chamber 16 of the disposable set 14 is mounted in the centrifuge rotor assembly 32 (FIG. 4). The umbilicus 24 is positioned in an inverted question-mark shape, extending from the centrifuge rotor assembly 32 and out through an opening 40 in the upper panel of the cabinet 26 (FIG. 3). The cassettes 22 are snapped into respective ones of the valve and pump stations 36 and the containers 20 are hung from the appropriate hangers 38 (FIG. 3). After appropriate connections are made to the donor using known intravenous techniques, the operator enters appropriate commands on the processing controller 30 to begin the processing procedure.

Looking more closely at the centrifuge rotor assembly 32 (FIGS. 3 and 4), it includes a chamber assembly 42 that is supported for rotation around an axis of centrifugation 44. The centrifuge further includes a centrifuge yoke assembly 46 that includes a yoke base 48, a pair of upstanding yoke arms 50, and a yoke cross member 52 mounted between the arms 50 (FIG. 3). The yoke base 48 is rotatably supported on a stationary platform 54 that carries the rotating mass of the centrifuge rotor assembly 32. The yoke base 48 is also supported for rotation around the axis of centrifugation independently of the chamber assembly 42. An electric drive 56 rotates the yoke assembly 46 relative to the stationary platform 54 around the axis of centrifugation 44. The chamber assembly 42 is free to rotate around the axis of centrifugation 44 at a rotational speed that is different from the rotational speed of the yoke assembly 46.

Referring further to FIG. 4, the chamber assembly 42 defines an annular chamber 58, centered around the axis of centrifugation 44, for receiving the processing chamber 16 of the disposable set 14. The umbilicus 24 extends through the lower center of the chamber assembly 42 in alignment with the axis of centrifugation 44. An anchor portion or end fitting 60 of the umbilicus 24 (referred to herein as the "two-omega end fitting") is received in a lowermost umbilicus mount 62 located at the lower center of the chamber assembly 42. The two-omega end fitting 60 and the umbilicus mount 62 function to transfer torque between the umbilicus 24 and chamber assembly 42 so that the chamber assembly 42 rotates around the axis of centrifugation in response to twisting of the umbilicus 24 around its axis.

The other end of the umbilicus 24 is defined by another anchor portion or end fitting 64 (referred to herein as the "zero-omega end fitting") that is removably received in an upper umbilicus mount 66 positioned over the centrifuge chamber assembly 42 substantially in alignment with the axis of centrifugation 44. An over-center clamp 68 at the end of the upper umbilicus mount 66 clamps onto the zero-omega end fitting 64 to hold the adjacent section of the umbilicus 24 rotationally stationary and in collinear alignment with the axis of centrifugation 44.

As further illustrated in FIG. 4, the portion of the umbilicus 24 between the zero-omega end fitting 64 and the two-omega end fitting 60 may be supported by a middle umbilicus mount or bearing support 70 that is carried at the lower end of a support or wing plate 72 extending outwardly and downwardly from the yoke cross member 52. As the electric drive 56 rotates the centrifuge yoke assembly 46 (FIG. 3) around the axis of centrifugation 44, the intermediate support or wing plate 72 and the bearing support 70 pull the midsection of the umbilicus 24 around the axis of centrifugation 44 as well. As the umbilicus 24 orbits around the axis 44, at rotational speed one-omega, a twisting action is imparted to the umbilicus 24 around its own axis. The midsection of the umbilicus 24 is free to rotate around its own axis relative to the wing plate 72 as the yoke assembly 46 is turned, so it will tend to "untwist" against the twisting motion imparted by the rotating yoke assembly 46. As it untwists in this manner, the umbilicus 24 spins the centrifuge chamber assembly 42 around the axis of centrifugation 44 at an average rotational speed of two-omega.

To maintain balance as the yoke assembly 46 turns, an additional support or wing plate 74 extends from the yoke cross member 52 diametrically opposite the wing plate 72. A counterweight 76 sufficient to balance the mass of the bearing support 70 and umbilicus 24 is preferably carried on the lower end of the additional wing plate 74.

To reduce the risk of damage to the umbilicus 24 during fluid processing, an umbilicus bearing assembly 78 may surround it and be received within the bearing support 70, in a manner well known to those skilled in the art. Exemplary umbilicus bearing assemblies are described in U.S. Pat. Nos. 5,989,177 and 8,277,369 to West et al., which are hereby incorporated herein by reference.

Figure 5:
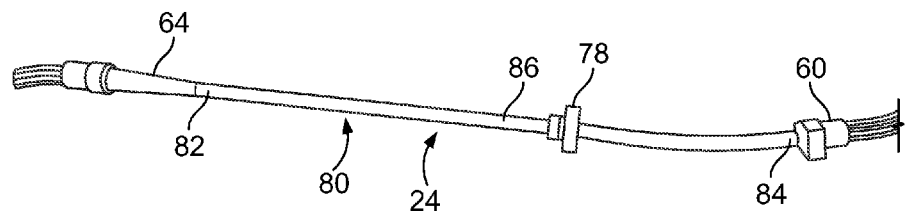
FIG. 5 is a side view of an umbilicus according to one aspect of the present disclosure.

FIG. 5 shows the umbilicus 24 isolated from the remainder of the disposable set 14. The umbilicus 24 preferably comprises and consolidates the multiple fluid paths leading to and from the processing chamber 16, although it may also have only a single flow path. In the illustrated blood processing application, it provides a continuous, sterile environment for fluids (such as blood and blood components) to pass. In construction, the umbilicus 24 is flexible enough to function in the relatively small, compact operating space that the centrifuge assembly 12 provides. Still, the umbilicus 24 is durable enough to withstand the significant flexing and torsional stresses imposed by the small, compact spinning environment, where continuous rotation rates of several thousand revolutions per minute may be typically encountered for periods of up to as much as two or three hours.

Figure 6:
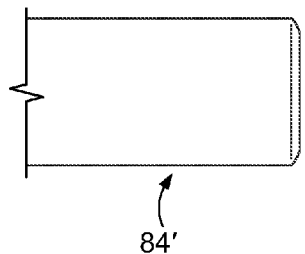
FIG. 6 is a detail view of an umbilicus body end in an unprocessed condition.
Figure 7:
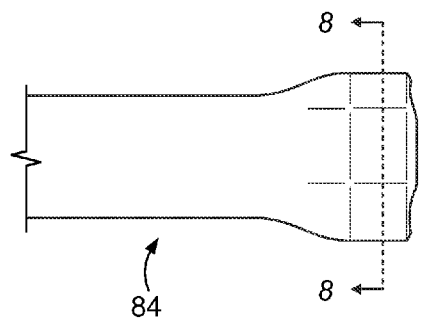
FIG. 7 is a detail view of an umbilicus body end in a processed or flared condition.

In the illustrated embodiment, the umbilicus 24 includes an umbilicus body 80 extending between first and second ends 82 and 84, with an intermediate section or midsection 86 located therebetween. FIG. 6 shows the second end 84 in an unprocessed or initial condition 84', while FIG. 7 shows the second end 84 in a processed or flared or enlarged condition. In one embodiment, the first end 82, when in an unprocessed or initial condition, is substantially identical to the second end 84' of FIG. 6 and, when in a processed or flared or enlarged condition, is substantially identical to the second end 84 of FIG. 7. Additional description of the enlarged ends 82 and 84 of the umbilicus body 80 and the means for enlarging the ends 82 and 84 is provided below.

Figure 8:
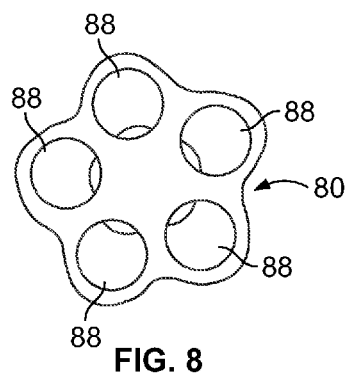
FIG. 8 is a cross-sectional view of the umbilicus body end of FIG. 7, taken through the line 8-8 of FIG. 7.

The umbilicus body 80 defines at least one and preferably a plurality of fluid-transmitting lumen 88 extending between the ends 82 and 84, as can be seen in FIG. 8. In the illustrated embodiment, five fluid-transmitting lumen 88 extend through the midsection 86, between the enlarged end 82, 84, which may be equal to the number of flow paths (which can be separate tubes or a single tube with multiple lumen or a combination of tubes with single and/or multiple lumen) connecting each end of the umbilicus 24 to the remainder of the disposable set 14 (as best illustrated in FIG. 2). Each lumen 88 is associated (in fluid flow communication) with one of the tubes or lumen leading into the processing chamber 16 at the second end 84 of the umbilicus body 80, and is also associated with one of the tubes or lumen leading to the remainder of the disposable set 14 at the first end 82 of the umbilicus body 80. Accordingly, the number of lumen 88 defined in the umbilicus body 80 may vary according to the number of tubes or lumen leading from the umbilicus 24 to the processing chamber 16 and the remainder of the disposable set 14.

While both ends 82 and 84 of the umbilicus body 80 are enlarged in a preferred embodiment, it is also within the scope of the present disclosure for only one end of the umbilicus body 80 to be enlarged. Various means may be employed to process the ends 82 and/or 84 of the umbilicus body 80 from the unprocessed condition 84' of FIG. 6 to the enlarged condition of FIG. 7. In one embodiment, a heated die is at least partially inserted into at least one of the lumen 88 at the end of the umbilicus body 80 to be enlarged, thereby enlarging the subject lumen 88 in that area of the umbilicus body 80. More preferably, a heated die or dies is/are at least partially inserted into all of the lumen 88 at the end of the umbilicus body 80 to be enlarged, either simultaneously or at different times to enlarge all of the lumen 88 at that end.

Figure 9:
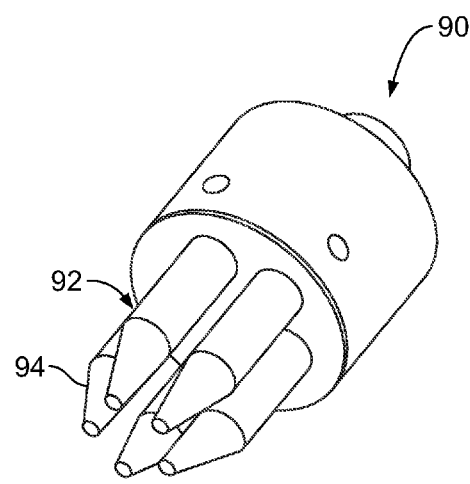
FIG. 9 is a perspective view of a die for use in processing an umbilicus body end from the unprocessed condition of FIG. 6 to the processed or flared condition of FIG. 7.
Figure 10:
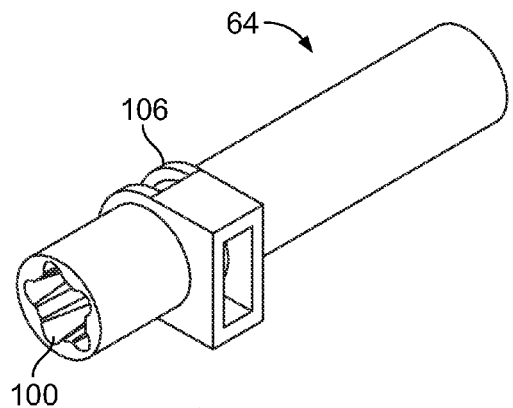
FIG. 10 is a front perspective view of a zero-omega end fitting of the umbilicus of FIG. 5.
Figure 11:
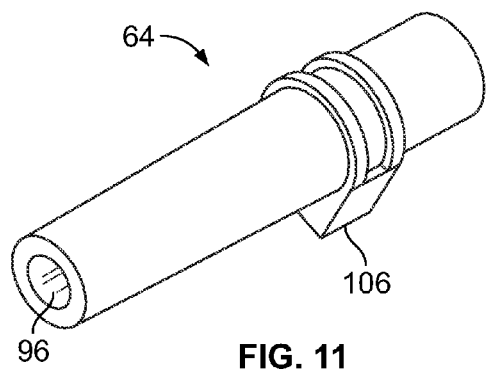
FIG. 11 is a rear perspective view of the zero-omega end fitting of FIG. 10.
Figure 12:
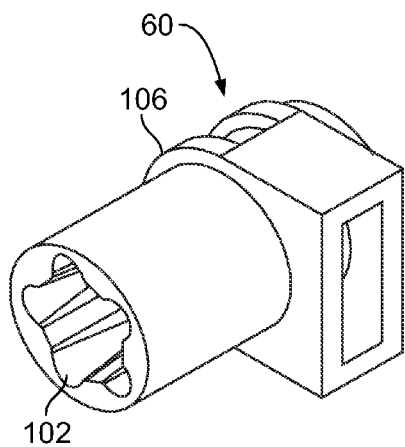
FIG. 12 is a front perspective view of a two-omega end fitting of the umbilicus of FIG. 5.
Figure 13:
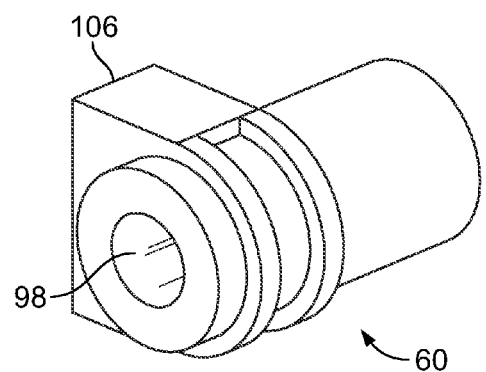
FIG. 13 is a rear perspective view of the two-omega end fitting of FIG. 12.

FIG. 9 shows an exemplary die 90 that, when heated, may be used to simultaneously enlarge all of the lumen 88 at one end of the umbilicus body 80. In the illustrated embodiment, the die 90 includes five pins 92 having generally conical or frusto-conical heads 94 for insertion into the five lumen 88 of the umbilicus body 80 at the end to be enlarged. In the embodiment of FIG. 9, the five pins 92 and heads 94 are substantially identical, but it is also within the scope of the present disclosure for the pins 92 and heads 94 to be differently configured from each other and from the particular configuration shown in FIG. 9.

At least a portion of each illustrated head 94 has a larger outer diameter than the inner diameter of the associated lumen 88 such that, by inserting the heads 94 into the lumen 88, the lumen 88 are enlarged at the subject end of the umbilicus body 80 in such a way that they have a varying size (which generally corresponds to the shape of the associated head 94). By providing heads 94 having varying outer diameters, the resulting enlarged lumen ends define a transition from the relatively small (i.e., unprocessed) size of the lumen 88 in the intermediate portion or midsection 86 of the umbilicus body 80 to a maximum size at the open ends of the umbilicus body 80. For example, in one embodiment, the diameters of the lumen 88 increase from approximately 0.085" to approximately 0.140" in the enlarged end sections. An umbilicus body end or a lumen section or any other structure so shaped (i.e., with a cross-sectional size that increases from a minimum at one section to a maximum at another section, preferably smoothly for improved flow dynamics) is referred to herein as being "flared." Hence, it can be seen that at least one of the lumen 88 (and preferably all of them) is flared at at least one of its ends (and preferably at both of its ends), which results in the associated end of the umbilicus body 80 being enlarged and flared as well.

In embodiments in which a die is used to form the enlarged lumen ends, the exact configuration of the resulting enlarged lumen ends depends on the configuration of the pins 92 and the extent to which they are inserted into the lumen 88. For example, if only the heads 94 of the pins 92 of the die 90 of FIG. 9 are inserted into the lumen 88, then the flared ends of the lumen 88 will be relatively short and have a varying diameter along their entire length. On the other hand, if the pins 92 are inserted farther into the lumen 88, then a portion of the pins 92 having a generally uniform outer diameter may enter into the lumen 88. In this case, the flared ends of the lumen 88 will be relatively long, with both a varying diameter section (corresponding to the location of the pin heads 94 during processing) and a uniform diameter section (corresponding to the location of the uniform diameter portion of the pins 92 during processing). Other profiles (preferably flared profiles) may also be employed without departing from the scope of the present disclosure.

Each end fitting 60, 64 (shown in greater detail in FIGS. 10-13) defines an interior cavity having a cross-sectional shape substantially similar to that of the associated end 84 and 82 of the umbilicus body 80 and configured to receive or seat at least a portion of such umbilicus body end 84, 82. In the illustrated embodiment, the interior cavity 96 of the zero-omega end fitting 64 is configured to receive at least a portion of the first end 82 of the umbilicus body 80, while the interior cavity 98 of the two-omega end fitting 60 is configured to receive at least a portion of the second end 84 of the umbilicus body 80.

In one embodiment, the interior cavities 96 and 98 of the end fittings 64 and 60 include flared portions 100 and 102 (FIGS. 10 and 12) that are substantially identical to each other and configured to mate with the enlarged, flared ends 82 and 84 of the umbilicus body 80. The mating cross-sectional shapes may be variously configured, although it may be advantageous for the mating cross-sectional shapes to be non-circular. By providing a non-circular cross-sectional shape, the umbilicus body ends are discouraged from rotating within the associated end fitting interior cavity. This is advantageous to ensure the proper transmission of torque between the ends of the umbilicus during use. Such an anti-rotation feature may be embodied in cross-sectional shapes that are either symmetrical or non-symmetrical. When the cross-sectional shapes are non-symmetrical, the ends of the umbilicus body will only seat within the associated end fittings in one particular orientation. On the other hand, when the cross-sectional shapes are non-symmetrical, the ends of the umbilicus body will seat within the associated end in more than one particular orientation. By way of example, the illustrated embodiment shows non-circular cross-sectional shapes that are symmetrical (see FIGS. 8, 10, and 12), which allows for greater flexibility when assembling the umbilicus because the umbilicus body ends may be inserted into the end fittings in a variety of different orientations.

More particularly, in the illustrated embodiment, the enlarged ends 82 and 84 of the umbilicus body 80 are effectively defined by the enlarged, flared ends of five lumen 88. In this configuration, it will be seen that the cross-sectional shape of the ends of the umbilicus body 80 (FIG. 8) is substantially symmetrical, but non-circular. As the enlarged ends 82 and 84 are defined by the enlarged, flared ends of five lumen 88 equidistantly spaced around the central axis of the umbilicus body 80, it will be seen that the cross-sectional shape of the illustrated enlarged end(s) of the umbilicus body 80 is generally star-shaped. Thus, to match the cross-sectional shape of the flared ends 82 and 84 of the illustrated umbilicus body 80, at least a portion of the interior cavities 98 and 96 of the end fittings 60 and 64 (the flared portions 102 and 100, in particular) are correspondingly generally star-shaped (FIGS. 10 and 12) to accommodate the umbilicus body ends 84 and 82 (see FIGS. 15 and 17). However, it should be understood that the enlarged end(s) of the umbilicus body 80 (and, hence, the flared portions 100 and 102 of the end fitting interior cavities 96 and 98) may have other cross-sectional shapes, depending on the number and orientation of the lumen 88.

Separately from or in addition to an anti-rotation arrangement between the umbilicus body ends and the end fittings, an adhesive or the like may be applied between the umbilicus body end and the associated end fitting interior cavity to better secure them together. The manner by which the umbilicus body is secured to the end fittings may vary depending on a number of factors, including the configuration and the material composition of the umbilicus body 80 and the end fittings 60 and 64. In one embodiment, the end fittings 60 and 64 may be made from the same material as the tubes or lumen connecting the umbilicus 24 to the remainder of the disposable set 14, typically PVC. To ensure proper transmission of torsion between the ends 82 and 84 so as to enable two-omega rotation of the chamber assembly 42, it is advantageous for the umbilicus body 80 to be manufactured of Hytrel® or another suitable thermoplastic polyester elastomeric material, but by making the end fittings 60 and 64 from a different material (such as PVC), the material cost of the umbilicus 24 may be reduced. In such an embodiment, a UV adhesive is an example of a suitable material for securing the umbilicus body and the end fittings.

Figure 14:
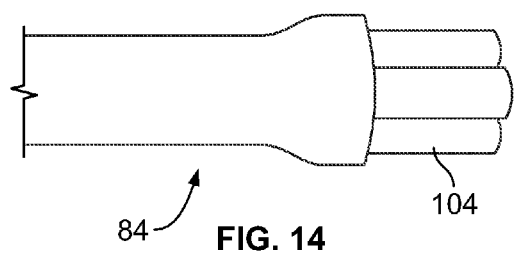
FIG. 14 is a side view of the umbilicus body end of FIG. 7, having a plurality of tubing segments associated therewith.
Figure 15:
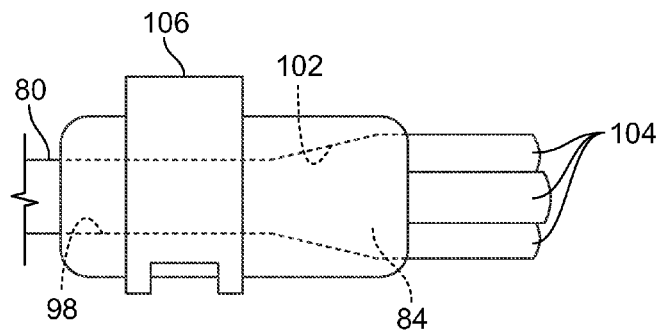
FIG. 15 is a side view of the umbilicus body end of FIG. 14, received within the two-omega end fitting of FIGS. 12 and 13.
Figure 16:
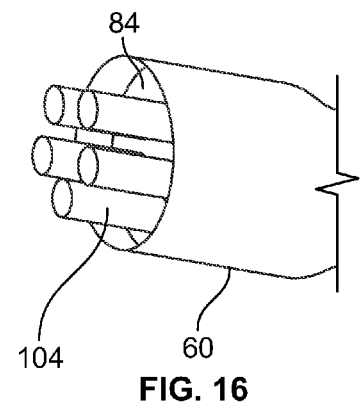
FIG. 16 is a front perspective view of the umbilicus body end and two-omega end fitting of FIG. 15.
Figure 17:
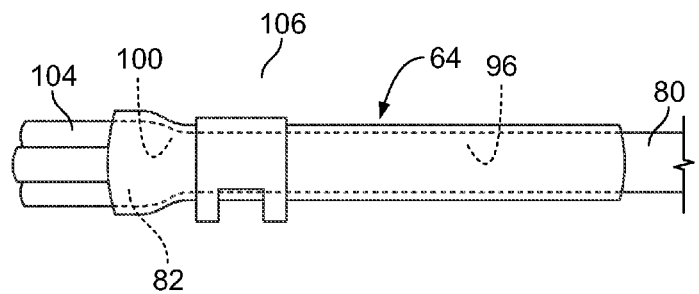
FIG. 17 is a side view of an umbilicus body end having a plurality of tubing segments associated therewith and received within the zero-omega end fitting of FIGS. 10 and 11.

FIGS. 15-17 show the enlarged ends 84 and 82 of the umbilicus body 80 received and seated within the interior cavities 98 and 96 of the end fittings 60 and 64. In the illustrated embodiment, the enlarged ends 84 and 82 of the umbilicus body 80 are fully received within the interior cavities 98 and 96, with tubing segments 104 (made of PVC in one embodiment) extending outside of the flared portions 102 and 100 of the end fittings 60 and 64 for connection to the tubing of the disposable set 14. FIG. 14 more clearly shows the tubing segments 104 received within the lumen 88 at the second end 84 of the umbilicus body 80. In one embodiment, a solvent (e.g., cyclohexanone) or the like is applied to the enlarged, flared ends of the lumen 88 and a portion of a tubing segment 104 is inserted into each lumen end. The tubing of the disposable set 14 is subsequently secured to the portions of the tubing segments 104 extending outside of the end fittings 60 and 64. Alternatively, the tubing segments 104 may be secured to the tubing of the disposable set 14 prior to being secured to the umbilicus lumen 88. Further, other means may be employed to connect the umbilicus body lumen 88 to the tubing of the disposable set 14.

As for the outer configurations of the end fittings 60 and 64, they may be substantially the same as known end fittings, which may be advantageous to allow an umbilicus 24 of the present disclosure to be readily used with prior art centrifuge assemblies without requiring any significant other modification. More particularly, each end fitting 60, 64 preferably has a keyed or non-uniform outer surface and may include, for example, an integral, molded lateral flange 106 to ensure a non-uniform outer surface, which is useful in clamping the end fittings 60 and 64 in place in a certain orientation when the umbilicus 24 is installed in the centrifuge assembly. In the illustrated embodiment, each flange 106 is generally D-shaped, although other configurations may also be employed without departing from the scope of the present disclosure.

According to one method of assembling the umbilicus 24, an umbilicus body 80 having a generally uniform outer diameter is provided. An umbilicus bearing assembly 78 is slid onto the umbilicus body 80 and moved toward its intermediate portion or midsection 86, away from the ends 82 and 84 of the umbilicus body 80. With the bearing assembly 78 positioned on the umbilicus body 80, the end fittings 60 and 64 are slid onto the umbilicus body 80 with the bearing assembly 78 positioned therebetween. The end fittings 60 and 64 are oriented with the flared portions 102 and 100 of their interior cavities 98 and 96 directed away from each other. Alternatively, one of the end fittings 60, 64 may be slid onto the umbilicus body 80 prior to sliding the bearing assembly 78 onto the umbilicus body 80.

With the bearing assembly 78 and end fittings 60 and 64 on the umbilicus body 80 and positioned at a location spaced from the umbilicus body ends 82 and 84, the ends 82 and 84 may be processed (e.g., using the aforementioned heated die 90) to enlarge them. As described above, it is within the scope of the present disclosure for only one of the umbilicus body ends 82, 84 to be enlarged. In an alternative embodiment, one of the umbilicus body ends 82, 84 may be enlarged prior to sliding one or more of the bearing assembly 78 and the end fittings 60 and 64 onto the umbilicus body 80.

When the end or ends 82, 84 of the umbilicus body 80 have been enlarged, the tubing segments 104 (if provided) may be inserted into the ends of the lumen 88 and secured thereto (as in FIG. 14). The umbilicus body ends 82 and 84 may then be seated and secured within the interior cavities 96 and 98 of the end fittings 64 and 60 (as in FIGS. 15-17). Additional UV adhesive or other potting material may be inserted into the open end of the end fittings 60 and 64 around the tubing segments 104 (if provided) to add additional strength and prevent bonded tubing from pulling out of or separating from the lumen 88. In other embodiments, the umbilicus body ends 84 and 82 may be secured to the end fittings 60 and 64 prior to inserting and securing the tubing segments 104 within the lumen 88. The bearing assembly 78 is also secured to the umbilicus body 80 (e.g., by a crimping operation or other suitable means) at some point during the manufacturing process.

Finally, with all of the various components of the umbilicus 24 secured to each other, the umbilicus 24 may be secured to the tubing of the disposable set 14, using the tubing segments 104 if provided.

The foregoing assembly steps may be practiced in a different order and/or additional assembly steps may be practiced and/or additional or different components may be incorporated into the umbilicus 24 during the assembly process without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the gasket member alone, the gasket member in combination with the hardware or cassette, and/or the gasket member in combination with the hardware and cassette.

The invention claimed is:

1. An umbilicus for use in an umbilicus-driven fluid processing system, comprising:
   an elongated umbilicus body including first and second ends and an intermediate section located therebetween, wherein the umbilicus body defines at least one fluid-transmitting lumen extending between the first and second ends; and
   a first end fitting defining an interior cavity, wherein
      the first end of the umbilicus body is enlarged compared to the intermediate section,
      the interior cavity of the first end fitting includes a flared portion, at least a portion of the enlarged first end of the umbilicus body is seated within the flared portion of the interior cavity of the first end fitting, and the umbilicus being free of a drive shaft.

2. The umbilicus of claim 1, wherein the at least one fluid-transmitting lumen comprises five lumen, with the enlarged first end of the umbilicus body defined by enlarged, flared ends of the five lumen.

3. The umbilicus of claim 1, wherein the umbilicus body and the first end fitting are comprised of different materials.

4. The umbilicus of claim 1, wherein the umbilicus body is comprised of a thermoplastic polyester elastomeric material and the first end fitting is comprised of polyvinyl chloride.

5. The umbilicus of claim 1, wherein the size of the at least one fluid-transmitting lumen is greater in the enlarged first end of the umbilicus body than in the intermediate section of the umbilicus body.

6. The umbilicus of claim 1, wherein the size of the at least one fluid-transmitting lumen varies in the enlarged first end of the umbilicus body.

7. The umbilicus of claim 1, further comprising a second end fitting defining an interior cavity, wherein the second end of the umbilicus body is enlarged compared to the intermediate section, the interior cavity of the second end fitting includes a flared portion, and at least a portion of the enlarged second end of the umbilicus body is seated within the flared portion of the interior cavity of the second end fitting.

8. The umbilicus of claim 7, wherein the flared portion of the interior cavity of the second end fitting is substantially identical to the flared portion of the interior cavity of the first end fitting.

9. The umbilicus of claim 7, wherein the enlarged second end of the umbilicus body is substantially identical to the enlarged first end of the umbilicus body.

10. The umbilicus of claim 6, wherein the size of the at least one fluid-transmitting lumen varies along the entire length of the enlarged first end of the umbilicus body.

11. The umbilicus of claim 6, wherein the size of the at least one fluid-transmitting lumen varies along only a portion of the length of the enlarged first end of the umbilicus body.

12. The umbilicus of claim 1, wherein the enlarged first end of the umbilicus body has a substantially symmetrical cross-sectional shape.

13. The umbilicus of claim 12, wherein the enlarged first end of the umbilicus body has a non-circular cross-sectional shape.

14. The umbilicus of claim 12, wherein the enlarged first end of the umbilicus body has a generally star-shaped cross-sectional shape.

15. The umbilicus of claim 1, wherein the interior cavity of the first end fitting has a generally star-shaped cross-sectional shape.

16. The umbilicus of claim 1, further comprising an adhesive securing the first end fitting and the umbilicus body.

17. The umbilicus of claim 1, wherein the enlarged first end of the umbilicus body is fully received within the interior cavity of the first end fitting.

18. The umbilicus of claim 1, further comprising a tubing segment associated with the at least one fluid-transmitting lumen, wherein a portion of the tubing segment extends outside of the interior cavity of the first end fitting.

19. The umbilicus of claim 18, wherein the first end fitting and the tubing segment are comprised of the same material.

20. The umbilicus of claim 1, wherein the at least one fluid-transmitting lumen comprises a plurality of lumen, wherein each lumen defined by the umbilicus body is a fluid-transmitting lumen.

21. An umbilicus for use in an umbilicus-driven fluid processing system, comprising:

an elongated umbilicus body including first and second ends and an intermediate section located therebetween, wherein the umbilicus body defines at least one fluid-transmitting lumen extending between the first and second ends;

first and second end fittings each defining an interior cavity, wherein the first and second ends of the umbilicus body are enlarged compared to the intermediate section, the interior cavities of the first and second end fittings each includes a flared portion, at least a portion of the enlarged first end of the umbilicus body is seated within the flared portion of the interior cavity of the first end fitting, at least a portion of the enlarged second end of the umbilicus body is seated within the flared portion of the interior cavity of the second end fitting, the first and second end fittings are trapped between the enlarged first and second ends of the umbilicus body, and the umbilicus being free of a drive shaft.

\* \* \* \* \*